(12) United States Patent
Brohan et al.

(10) Patent No.: US 7,858,064 B2
(45) Date of Patent: Dec. 28, 2010

(54) TITANIUM AQUO-OXO CHLORIDE AND PREPARATION METHOD THEREOF

(75) Inventors: Luc Brohan, La Chapelle sur Erdre (FR); Hari Sutrisno, Yogyakarta (ID); Eric Puzenat, Nantes (FR); Annabelle Rouet, La Roche sur Yon (FR); Hélène Terrisse, Nantes (FR)

(73) Assignee: Centre National de la Recherche Scientifique, Paris (FR)

( * ) Notice: Subject to any disclaimer, the term of this patent is extended or adjusted under 35 U.S.C. 154(b) by 1123 days.

(21) Appl. No.: 10/555,926

(22) PCT Filed: Apr. 29, 2004

(86) PCT No.: PCT/FR2004/001038

§ 371 (c)(1),
(2), (4) Date: Sep. 1, 2006

(87) PCT Pub. No.: WO2004/101436

PCT Pub. Date: Nov. 25, 2004

(65) Prior Publication Data

US 2007/0041890 A1    Feb. 22, 2007

(30) Foreign Application Priority Data

May 9, 2003   (FR) .................................. 03 05619

(51) Int. Cl.
*C01G 23/00*   (2006.01)
(52) U.S. Cl. ....................... 423/462; 423/492; 423/608; 423/610
(58) Field of Classification Search ................. 423/462, 423/472, 492, 608, 610
See application file for complete search history.

(56) References Cited

U.S. PATENT DOCUMENTS 4,757,037 A * 7/1988 Colombet et al. ........... 501/134
4,923,682 A * 5/1990 Roberts et al. .............. 423/611
5,024,827 A * 6/1991 Jones et al. ................. 423/610

FOREIGN PATENT DOCUMENTS

WO       WO 0166652 A1 *  9/2001

OTHER PUBLICATIONS

M.G. Reichmann et al., Structure of $[Ti_8O_{12}(H_2O)_{24}]Cl_8 \cdot HCl \cdot 7H_2O$, Acta Cryst (1987), vol. C43, pp. 1681-1683.
Mark G. Reichmann and Alexis T. Bell, "Raman Study of the Preparation of $SiO_2$-Supported $TiO_2$ from $TiCl_4$ and $HCl^{\dagger}$", Langmuir (1987), vol. 3, pp. 111-116.
Sun-Jae Kim et al. "Homogeneous Precipitation of $TIO_2$ Ultrafine Powders from Aqueous $TiOCl_2$ Solution", Journal of the American Ceramic Society (1999), vol. 82, No. 4, pp. 927-932.
International Search Report dated Nov. 5, 2004.

* cited by examiner

*Primary Examiner*—Ngoc-Yen M Nguyen
(74) *Attorney, Agent, or Firm*—Buchanan Ingersoll & Rooney PC

(57) ABSTRACT

The invention relates to a titanium aquo-oxo chloride and to a method for its preparation. The compound is in the form of crystals and has the following composition by weight: 26.91% Ti; 21.36% Cl; and 4.41% H, which corresponds to the formula $[Ti_8O_{12}(H_2O)_{24}]Cl_8 \cdot HCl \cdot 7H_2O$. The method of preparation consists in hydrolyzing $TiOCl_2$ either in an atmosphere whose moisture content is maintained between 50 and 60%, or by an alkali metal carbonate $A_2CO_3$, in order to obtain a titanium aquo-oxo chloride. The compound is useful as a semiconductor element of a photovoltaic cell or as a photocatalyst in air or water purification treatments.

7 Claims, 7 Drawing Sheets

(A)                              (B)

TITANIUM AQUO-OXO CHLORIDE AND PREPARATION METHOD THEREOF

FIELD OF THE INVENTION

The invention relates to a titanium aquo-oxo chloride, to a method for its preparation and to various applications.

DESCRIPTION OF THE RELATED ART

Heterogeneous photocatalysis using titanium dioxide on a support is an advanced oxidation technique finding applications especially in the decontamination of water and air. It relies on the conversion of molecules on the surface of titanium dioxide through the action of UV radiation and in the presence of oxygen and water, which may result in complete degradation into simple components, such as $CO_2$, $H_2O$ and $NO_3^-$. The efficiency of the photocatalyst depends on its physicochemical properties, its allotropic form, its specific surface area or its surface acidity. The use of the photocatalyst deposited on a support dispenses with the filtration steps for recovering the photocatalyst in the case of the decontamination of water or to optimize the contact between the polluted effluents and the photocatalyst in the case of the decontamination of air. The supports used for the catalysts vary. Examples that may be mentioned include pulverulent, fibrous or bulk oxides (for example $SiO_2$ or $Al_2O_3$), fibrous celluloses (paper), synthetic polymers, and glass. A $TiO_2$ layer may be deposited on a support by a sol-gel process, in which a titanium dioxide powder in suspension is used directly, or a precursor, such as titanium tetrachloride or a titanium alkoxide which is converted into titanium dioxide after a heat treatment, is used. Depending on the source of titanium dioxide, the deposition may be carried out using the technique of dip-coating, spray-coating or chemical vapor deposition. The pulverulent titanium oxide is made to adhere to the support by use of silicon alkoxides and/or titanium alkoxides in polymeric form. The $TiO_2$ films deposited by the sol-gel process have major drawbacks as regards abrasion and/or corrosion resistance of the layers. They are difficult to obtain in the form of thick coatings (>1 µm) without cracking. The films are generally quite brittle and have a low abrasion resistance. Furthermore, an opposing effect generally exists between adhesion of the $TiO_2$ to the support and the specific photocatalytic activity of the $TiO_2$. Relatively high temperatures are needed to obtain $TiO_2$ and to achieve good properties (T=350 to 450° C.), but within this temperature range the $Na^+$ ions contained in the glass used as substrate are observed to diffuse into the $TiO_2$ layer. This diffusion is detrimental to the photocatalitic activity, since the $Na^+$ ions promote the recombination of electron-hole pairs, and it is therefore necessary to interpose a barrier layer, thereby introducing an additional cost.

Reichmann et al., [Acta Cryst. (1987), C43, 1681-1683] have identified, in the product formed by the spontaneous reaction of $TiCl_4$ with moisture in the air, a compound whose formula deduced by XRD (X-ray diffraction) analysis on a single crystal is $[Ti_8O_{12}(H_2O)_{24}]Cl_8.HCl.7H_2O$. This oxychloride takes the form of small colorless irregular crystals lying in the middle of a clump of powder. Small irregular crystals have been isolated from the center of the agglomerates and subjected to various analyses. The stoichiometry of these crystals corresponds to $[Ti_8O_{12}(H_2O)_{24}]Cl_8.HCl.7H_2O$ and the structure is constructed from a cubic titanium octamer. The data relating to this compound has been published in PDF (Powder Diffraction File) 01-078-1628 published by the ICDD (International Center for Diffraction Data) on the site www.icdd.com. The monoclinic cell parameters are the following: a=20.30580(20) Å, b=11.71720(18) Å, c=25.39840(15) Å, β=117.201(6)° and the C2/c symmetry group. However, the presence of many water molecules, the occupancy factors of which are not integers, indicates in a compositional distribution and/or disorder associated with a poor quality of the crystallites.

SUMMARY OF THE INVENTION

Since the interactions between surfaces and the properties of the interfaces may affect the performance of the materials, the object of the invention is to provide a novel method of preparing a titanium oxide precursor suitable for the manufacture of devices in which the titanium oxide is in the form of a film on a substrate, especially for photocatalysis or for the production of semiconductor elements.

The subjects of the present invention are therefore a method of preparing a titanium aquo-oxo chloride, the titanium aquo-oxo chloride obtained, and its applications.

DETAILED DESCRIPTION OF THE PREFERRED EMBODIMENTS

Figure 1:
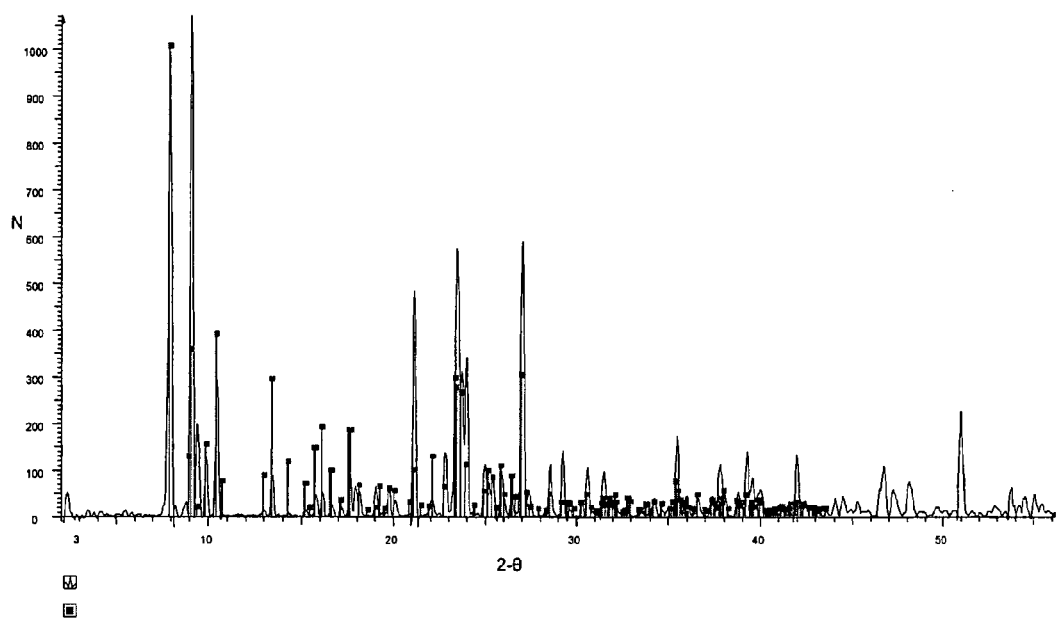
FIG. 1 shows the diffraction diagram of the compound of Example 1 ($[Ti_8O_{12}(H_2O)_{24}]Cl_8.HCl.7H_2O$ of the titanium aquo-oxo chloride) superimposed on the theoretical diagram.

The method of preparing a titanium aquo-oxo chloride according to the invention consists in hydrolyzing $TiOCl_2$ either in an atmosphere whose moisture content is maintained between 50 and 60%, or by an alkali metal carbonate $A_2CO_3$, in order to obtain a titanium aquo-oxo chloride, denoted hereafter by "$Ti_8O_{12}$".

Since the compound $TiOCl_2$ is very hygroscopic, it is used dissolved in concentrated hydrochloric acid aqueous solution, that is to say in the form of an aqueous TiOCl$_2$.yHCl solution. The HCl concentration of the solution is advantageously about 2M. The TiOCl$_2$ concentration in this solution is preferably between 4M and 5.5M. 4.3M or 5M TiOCl$_2$ solutions in a concentrated HCl solution are commercially available. The compound TiOCl$_2$.yHCl is denoted hereafter by "TiOCl$_2$".

To hydrolyze the "TiOCl$_2$" compound by maintaining it in an atmosphere having a moisture content of 50 to 60%, it is particularly advantageous to place a "TiOCl$_2$" solution at room temperature above an H$_2$SO$_4$/H$_2$O mixture in respective amounts such that the relative humidity is around 50 to 60% and to leave it in contact therewith for about five weeks. The conversion takes place according to the following reaction scheme:

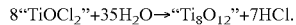

8"TiOCl$_2$"+35H$_2$O→"Ti$_8$O$_{12}$"+7HCl.

The sulfuric acid present in the reaction medium allows removal of the HCl that forms.

When the hydrolysis is carried out by a carbonate, a "TiOCl$_2$" solution is bought into contact at room temperature with an alkali metal carbonate A$_2$CO$_3$ in respective amounts such that the Ti/A ratio is 4±0.5, preferably 4±0.1, and left in contact therewith for 48 to 72 hours. The conversion takes place according to the following reaction scheme:

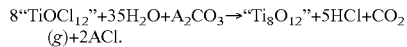

8"TiOCl$_{12}$"+35H$_2$O+A$_2$CO$_3$→"Ti$_8$O$_{12}$"+5HCl+CO$_2$(g)+2ACl.

The "Ti$_8$O$_{12}$" compound is obtained in the form of crystals by the method of the invention. It has the following composition by weight: 26.91% Ti; 21.36% Cl; and 4.41% H, which corresponds to the formula [Ti$_8$O$_{12}$(H$_2$O)$_{24}$]Cl$_8$.HCl.7H$_2$O of titanium aquo-oxo chloride, denoted hereafter by "Ti$_8$O$_{12}$".

Said compound has a monoclinic structure. The monoclinic cell parameters are the following: a=20.3152(11) Å, b=11.718(7) Å, c=24.2606(16) Å, β=111.136(7)° and the symmetry group is Cc.

The "Ti$_8$O$_{12}$" compound is soluble in polar solvents, such as for example water, methanol, ethanol, etc. It may be preserved in "Ti$_8$O$_{12}$" form in these solutions by keeping the pH at a value below 2, which stabilizes the [Ti$_8$O$_{12}$(H$_2$O)$_{24}$]$^{8+}$ cation.

Monodispersed "Ti$_8$O$_{12}$" particles in a polar solvent may be obtained in 24 hours by adjusting the ionic strength of the solution to a Cl$^-$ value of between 10$^{-2}$ and 10$^{-3}$. One illustrative example consists in introducing, into a polar solvent, an amount of "Ti$_8$O$_{12}$" such that the titanium concentration [Ti] is for example 0.1M and an amount of alkali metal chloride such that the chloride concentration [Cl$^-$] is between 10$^{-2}$M and 10$^{-3}$M. The addition of chloride ions into these solutions promotes the dissociation of "Ti$_8$O$_{12}$" crystals and the dispersion of the clusters in the polar solvent, owing to the fact that the Cl$^-$ ions surround the [Ti$_8$O$_{12}$(H$_2$O)$_{24}$]$^{8+}$ polycation.

The solutions thus obtained may be used to deposit thin layers formed from crystals on a substrate. The deposition may be carried out using the dip-coating, spray-coating or chemical vapor deposition techniques for all types of substrate, for example a glass substrate, or by electroplating when the substrate is metallic. The layers thus obtained exhibit excellent adhesion to basic supports because of the acid-base chemical interaction between the positively charged polycation [Ti$_8$O$_{12}$(H$_2$O)$_{24}$]$^{8+}$ and the basic support, for example glass.

"Ti$_8$O$_{12}$" solutions may also be used for the in situ preparation at room temperature of standard forms of TiO$_2$, but also novel varieties in which the lattice dimensionality and the size of the particles are controlled. Through precise pH control and the choice of solvent for the solution containing the "Ti$_8$O$_{12}$" compound, other polycondensed (1D, 2D, 3D) titanium oxide forms may be prepared. As mentioned above, keeping a "Ti$_8$O$_{12}$" solution in a polar solvent at a pH<2 preserves the "Ti$_8$O$_{12}$" in the form of titanium aquo-oxo chloride because the [Ti$_8$O$_{12}$(H$_2$O)$_{24}$]$^{8-}$ polycation is stabilized. In a "Ti$_8$O$_{12}$" solution at a pH of between 2 and 3, the titanium aquo-oxo chloride starts to hydrolyze and forms a polymer. When the pH of the solution is between 4 and 6, that is to say as the solution tends toward the point of zero charge, the titanium aquo-oxo chloride is hydrolyzed, to form 3D solids. The most highly charged particles are the most stable and the polycondensation rate increases as the point of zero charge is approached. To slow the rate down, solvents of lower dielectric constant are used ($\in_{H_2O}$=78.5; $\in_{ethanol}$=24.3). The pH of an alcoholic solution may be reduced, for example, by the addition of tetramethyl ammonium hydroxide (TMAOH).

The "Ti$_8$O$_{12}$" product obtained by the proposed method is useful in particular as a semiconductor element of a photovoltaic cell. Another subject of the invention is a photovoltaic cell in which the semiconductor element consists of a titanium aquo-oxo chloride according to the present invention.

The product according to the invention is also useful as a photocatalyst in air or water purification treatments. The subject of the invention is therefore also a photocatalytic air purification process in which the catalyst is a titanium aquo-oxo chloride according to the present invention on a support, and a photocatalytic aqueous effluent purification process in which the catalyst is a titanium aquo-oxo chloride according to the invention on a support. For this application, it is particularly preferred to use monodisperse solutions in which the particle diameter is about 2 nm (0D), thereby considerably increasing the specific surface area.

The present invention will be described in greater detail by the examples given below, to which it is however not limited.

The supports used for depositing "Ti$_8$O$_{12}$" layers are glass plates cleaned beforehand using an RBS solution diluted to 2% in pure water. The RBS solution, sold by Saint-Gobain, is an alkaline solution containing anionic surfactants, phosphates, hydrates and chlorinated agents.

EXAMPLE 1

"Ti$_8$O$_{12}$" Preparation

A few milliliters of a 5.5M aqueous TiOCl$_2$.yHCl solution were placed at room temperature in a desiccater containing 500 ml of an H$_2$SO$_4$/H$_2$O mixture so as to control the relative humidity. After several days, transparent crystals formed, their size varying between one millimeter and one centimeter. The crystals obtained were kept in sealed containers in order to avoid any degradation.

Chemical Analysis

Chemical analysis gave the following composition by weight: 26.91% Ti; 21.36% Cl; and 4.41% H. It corresponded to the formula [Ti$_8$O$_{12}$(H$_2$O)$_{24}$]Cl$_8$.HCl.7H$_2$O of the titanium aquo-oxo chloride.

Analysis by XRD (X-Ray Diffraction)

The compound obtained was dried and the powder obtained was subjected to an XRD analysis. The XRD analysis obtained was carried out using a C-centered monoclinic cell determined for a compound of formula [Ti$_8$O$_{12}$(H$_2$O)$_{24}$]Cl$_8$.HCl.7H$_2$O by the aforementioned Reichmann et al. The positions of the diffraction lines and their integrated intensities were determined using the program PROLIX developed by J. M. Barbet, P. Deniard and R. Brec, ("PROLIX", *Treatment of Inel X-ray Curve Detector Powder Diffraction Data: Chains, Program and Experimental Results*). The crystal parameters were refined using the U-FIT program described by M. Evain ("U-FIT", *A Cell Parameter Program*, IMN-Nantes (1992)].

With the exception of c and β, the refined cell parameters [a=20.305(7) Å, b=11.716(6) Å, c=25.390(4) Å and β=115.001(8)°] are in good agreement with those obtained by single-crystal diffraction [a=20.3152(11) Å, b=11.718(7) Å, c=24.2606(16) Å and β=111.136(7)°]. The recorded differences result from a substantially different choice of lattice between the refinement based on powder and based on a single crystal.

The characteristic factors of the refinement are the mean difference D between $2\theta_{obs}$ and $2\theta_{calc}$, $$D = \frac{1}{n_{hkl}} \sum |d(2\theta)| = 0.0108$$

and R, the confidence factor given by the following equation:

$$R = \frac{1}{n_{hkl} - n_{var}} \sum (2\theta_{obs} - 2\theta_{calc})^2 = 0.0139°,$$

where $n_{hkl}$ is the number of reflections analyzed and $n_{var}$ is the number of refined variables.

The XRD analysis shows that obtaining "$Ti_8O_{12}$" is quantitative, no spurious line being identified. The indexing and relative intensities of the diffraction lines are given in the following table:

| hkl | $2\theta_{obs}$ (°) | $2\theta_{calc}$ (°) | Intensity I/I$_0$ |
|---|---|---|---|
| 002 | 7.820 | 7.810 | 100 |
| 110 | 8.987 | 8.982 | 85 |
| $\bar{2}$02 | 9.348 | 9.338 | 34 |
| 200 | 9.790 | 9.773 | 12 |
| $\bar{1}$12 | 10.349 | 10.350 | 43 |
| 112 | 13.319 | 13.296 | 1 |
| 004 | 15.650 | 16.656 | 6 |
| $\bar{1}$14 | 16.022 | 16.019 | 3 |
| 022 | 17.054 | 17.023 | 3 |
| 22$\bar{1}$ | 17.477 | 17.465 | 19 |
| 22$\bar{2}$ | 17.793 | 17.785 | 7 |
| 220 | 18.006 | 18.019 | 4 |
| 22$\bar{3}$ | 18.963 | 18.936 | 4 |
| 400 | 19.649 | 19.617 | 5 |
| 31$\bar{5}$ | 19.918 | 19.906 | 4 |
| 312 | 20.984 | 20.990 | 21 |
| 13$\bar{1}$ | 23.242 | 23.223 | 74 |
| 115 | 23.557 | 23.566 | 89 |
| 13$\bar{2}$ | 23.846 | 23.843 | 34 |
| 025 | 24.820 | 24.839 | 8 |
| 13$\bar{3}$ | 25.070 | 25.083 | 28 |
| 510 | 25.765 | 25.753 | 15 |
| 13$\bar{4}$ | 26.872 | 26.862 | 78 |
| 331 | 28.437 | 28.427 | 17 |
| 13$\bar{5}$ | 29.091 | 29.089 | 5 |
| 206 | 29.515 | 29.493 | 2 |
| 040 | 30.461 | 30.475 | 6 |
| 11$\bar{8}$ | 30.665 | 30.638 | 5 |
| 33$\bar{6}$ | 31.379 | 31.398 | 4 |
| 008 | 31.617 | 31.614 | 6 |
| 71$\bar{3}$ | 32.013 | 32.000 | 11 |
| 31$\bar{9}$ | 32.645 | 32.648 | 5 |
| 316 | 34.120 | 34.123 | 4 |
| 531 | 35.320 | 35.302 | 12 |
| 80$\bar{6}$ | 35.830 | 35.830 | 4 |
| 045 | 36.490 | 36.498 | 6 |
| 532 | 37.265 | 37.251 | 9 |
| 13$\bar{8}$ | 37.695 | 37.690 | 17 |
| 53$\bar{8}$ | 37.980 | 37.951 | 5 |
| 42$\overline{10}$ | 38.655 | 38.658 | 10 |
| 119 | 39.108 | 39.084 | 3 |
| 35$\bar{3}$ | 41.057 | 41.034 | 3 |
| 80$\overline{10}$ | 41.712 | 41.700 | 1 |
| 24$\bar{8}$ | 42.191 | 42.177 | 3 |
| 33$\overline{10}$ | 42.567 | 42.543 | 1 |
| 427 | 43.942 | 43.940 | 4 |
| 20$\overline{12}$ | 44.384 | 44.374 | 8 |
| 625 | 45.738 | 45.742 | 3 |
| 55$\bar{6}$ | 46.465 | 46.451 | 7 |
| 93$\bar{4}$ | 46.648 | 46.673 | 4 |
| 100$\bar{2}$ | 47.124 | 47.107 | 10 |
| 31$\overline{13}$ | 47.971 | 47.967 | 10 |
| 13$\overline{11}$ | 48.143 | 48.159 | 7 |
| 446 | 48.935 | 48.919 | 1 |
| 73$\overline{12}$ | 50.803 | 50.813 | 5 |
| 55$\bar{9}$ | 51.403 | 51.381 | 1 |
| 71$\overline{14}$ | 51.920 | 51.887 | 3 |
| 913 | 52.738 | 52.731 | 11 |
| 120$\bar{9}$ | 54.938 | 54.955 | 1 |
| 159 | 55.332 | 55.320 | 5 |
| 13$\overline{13}$ | 55.889 | 55.873 | 2 |
| 843 | 56.943 | 56.934 | 4 |

FIG. 1 shows the diffraction diagram of the compound of the present example, superimposed on the theoretical diagram obtained from the data from the PDF file 01-078-1628 (corresponding to the aforementioned compound described by Reichmann et al.). In the theoretical diagram, the lines are depicted by a single vertical line surmounted by a square. It is apparent that the intensities of the lines show substantial differences.

Thermal Analysis

The thermal behaviour of specimens dried at room temperature was studied by thermogravimetric analysis (TGA) coupled with differential scanning calorimetry (DSC).

The TGA and DSC analyses were carried out using a SETARAM TG-DSC 111 instrument on specimens of about 20 mg heated at a rate of 5 K/min or 2 K/min in a stream of argon. The gases released during the heat treatment were identified using a LEYBOLD H300CIS instrument.

Figure 2:
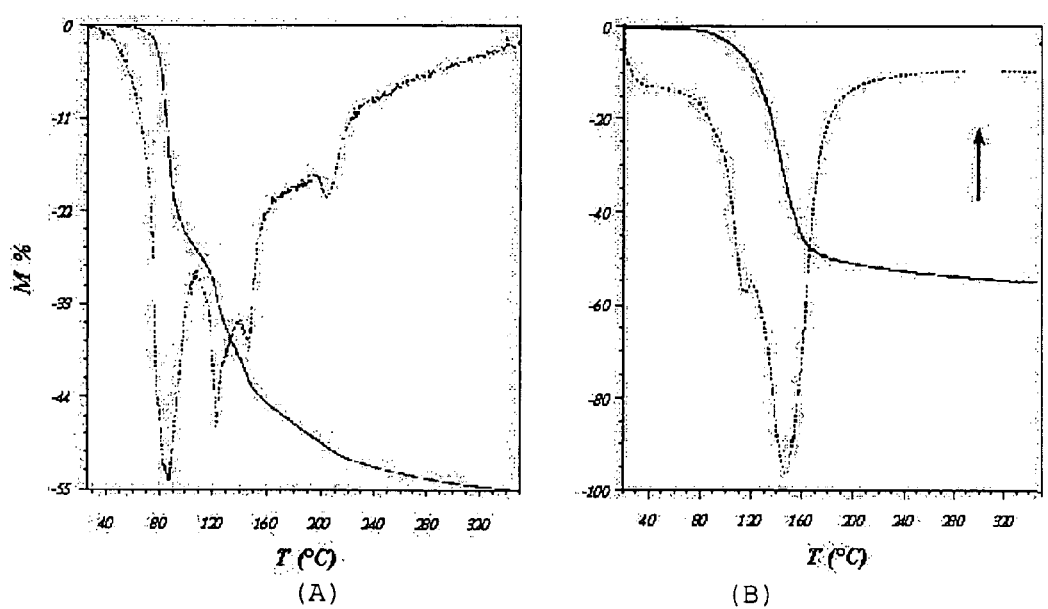
FIG. 2A shows the thermogravimetric curves (in solid lines) and the differential scanning calorimetry curves (in dotted lines) for the "$Ti_8O_{12}$" phase recorded in argon at a heating rate of 2 K/min.
FIG. 2B shows the thermogravimetric curves (in solid lines) and the differential scanning calorimetry curves (in dotted lines) for the "$Ti_8O_{12}$" phase recorded in argon at a heating rate of 5 K/min.

FIG. 2 shows the thermogravimetric curves (in solid lines) and the differential scanning calorimetry curves (in dotted lines) for the "$Ti_8O_{12}$" phase recorded in argon at a heating rate of 2 K/min (curves 2A) and 5 K/min (curves 2B). The weight loss M (in %) is plotted on the y-axis as a function of the temperature T (in ° C.) plotted on the x-axis.

The pulverulent final product obtained at 400° C. corresponded to the anatase variety of $TiO_2$, identified from its powder X-ray diagram. The thermohydrolysis reaction observed at about 150° C. (FIG. 2B) is manifested on the TGA/DSC curves by two intense endothermic peaks located at 110° C. and 148° C., these being accompanied by a rapid weight loss. The experimental weight loss (55%) is comparable to the expected weight loss (56%).

Differential thermogravimetric analysis (DTGA) was carried out so as to decouple the kinetically controlled events from the thermodynamically controlled events. The experiment consisted, after having set a temperature ramp, in slaving the latter to the weight loss above a certain threshold so that the rate of temperature rise was decreased as the weight loss increased. The thermogram profile is then appreciably modified since four pseudo-plateaus may be discerned (FIG. 2A), suggesting the existence of reaction intermediates. Between each plateau, the weight losses are 28%, 14%, 7% and 6%, respectively.

EXAMPLE 2

"$Ti_8O_{12}$" Preparation

Sodium carbonate was added to a 5.5M aqueous $TiOCl_2.yHCl$ solution in proportions such that the Ti/Ca molar ratio was equal to 4, and then the mixture was introduced into a petri dish placed at room temperature. The formation of transparent crystals was observed after 48 hours. The crystals were recovered as in Example 1 and then kept in a sealed container.

EXAMPLE 3

Preparation of a "$Ti_8O_{12}$" Solution

An aqueous "$Ti_8O_{12}$" solution, whose titanium concentration (Ti) was 0.1M, was prepared by introducing 1.8172 g of "$Ti_8O_{12}$", prepared according to the operating method of Example 1, into 100 ml of ultrapure water. One fraction of the solution obtained was diluted tenfold, in order to obtain a solution in which the titanium concentration was 0.01M.

Figure 3:
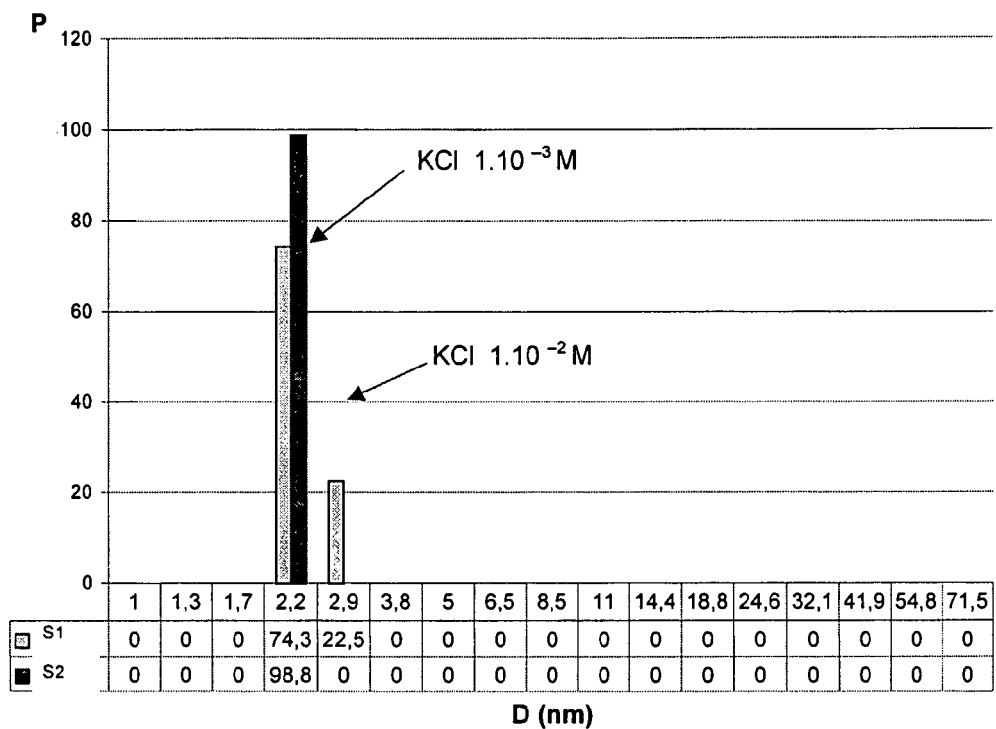
FIG. 3 provides hydrodynamic diameters of "$Ti_8O_{12}$" particles in monodisperse solutions measured by proton correlation spectroscopy, as described in Example 3.
Figure 4:
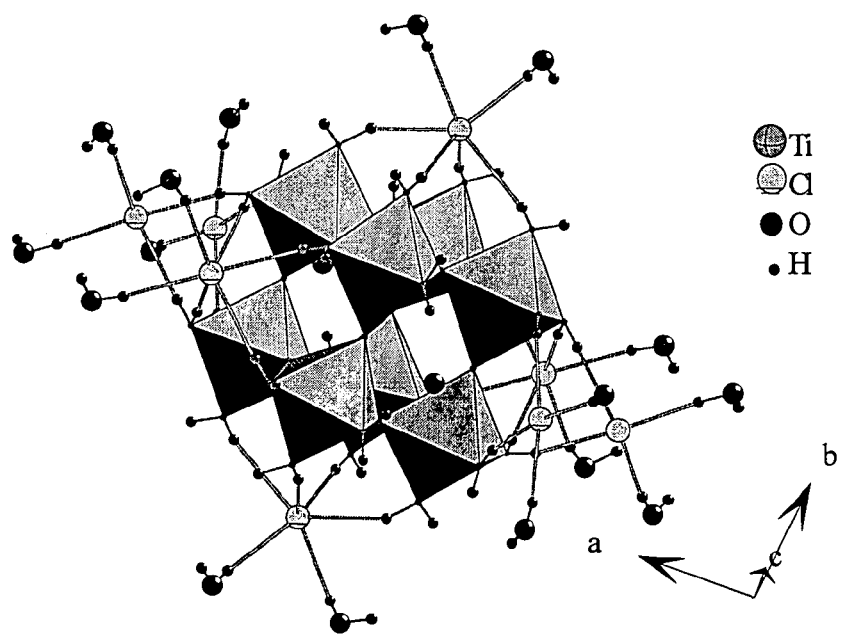
FIG. 4 illustrates the crystallographic data of a "$Ti_8O_{12}$" compound.

To test the influence of the ionic strength on the size of the "$Ti_8O_{12}$" particles in solution, variable amounts of pulverulent KCl were added. These amounts corresponded to the formation of solutions having KCl concentrations, denoted by [Cl⁻], of $10^{-1}$M, $10^{-2}$M, $10^{-3}$M and $10^{-4}$M. The hydrodynamic diameters of the particles were measured by photon correlation spectroscopy using a Beckman-Coulter N4 plus instrument. Polydisperse solutions in which the particle sizes were distributed in several classes were obtained for [Ti]= 0.1M and [Cl⁻]=$10^{-1}$M or $10^{-4}$M. Monodisperse solutions were obtained for [Ti]=0.1M and [Cl⁻]=$10^{-2}$M or $10^{-3}$M. The hydrodynamic diameters for the monodisperse solutions are given in FIG. 3. The hydrodynamic diameter D (in nm) is plotted on the X-axis. The percentage by weight P is plotted on the Y-axis and the corresponding values are indicated in the "S1" and "S2" rows. The S1 row corresponds to a KCl concentration of $10^{-2}$M and the S2 row corresponds to a KCl concentration of $10^{-3}$M. It is apparent that the diameters are centered around 2.2 nm. This value is similar to that determined from the crystallographic data and corresponds to a "$Ti_8O_{12}$" cluster surrounded by chlorine atoms and water molecules, as shown in FIG. 4.

EXAMPLE 4

Deposition of "$Ti_8O_{12}$" Films on Glass by Dip Coating

An alcoholic "$Ti_8O_{12}$" solution, the titanium concentration of which was 0.35M, was prepared in a beaker by introducing 3.8161 g of "$Ti_8O_{12}$" into 60 ml of anhydrous ethanol. The beaker containing the solution was placed on a support whose height was adjustable. A glass plate of the "microscope slide" type, fastened using a clamp, was held vertically above the beaker. The deposition was carried out by dip coating, which consisted in dipping the glass plate into the solution and then withdrawing it at a constant rate. After dip coating, the plate was dried in air for about 5 minutes. This operation was repeated five times. The plate was then placed in an oven in which a heat treatment was carried out, consisting in raising the temperature to 300° C. over 2 h, maintaining this temperature for 4 h and then cooling down to 20° C. over 4 h.

Figure 5:
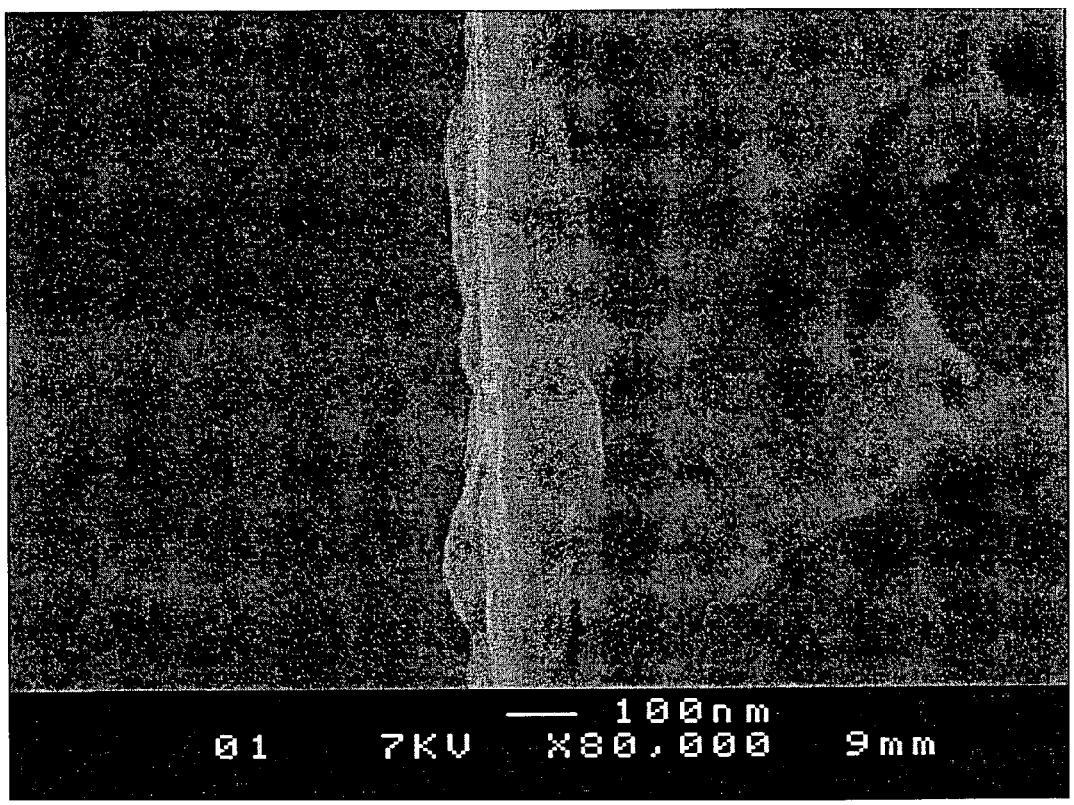
FIG. 5 shows the SEM image of a cross section through a "$Ti_8O_{12}$" film prepared according to Example 4.
Figure 6:
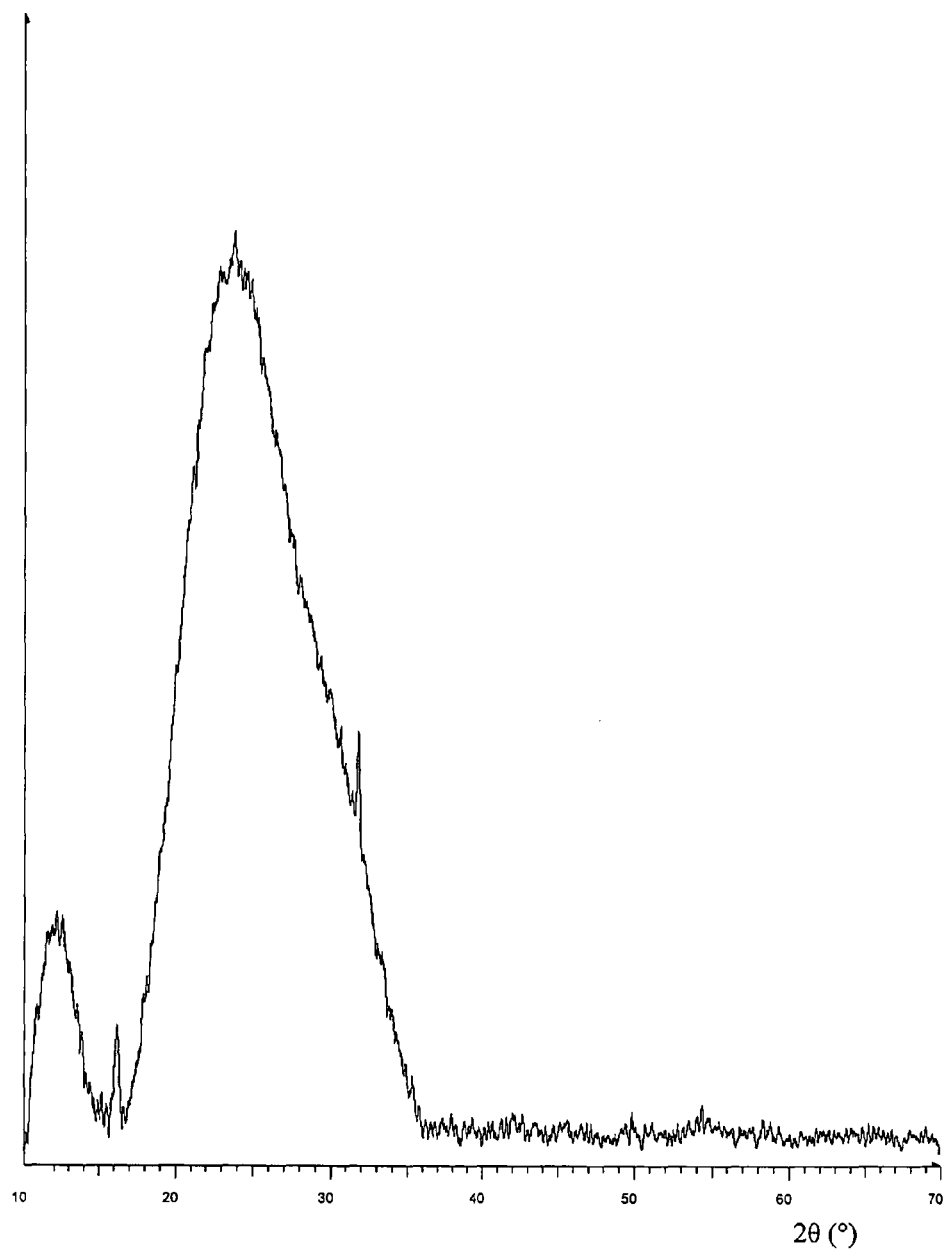
FIG. 6 shows the X-ray diffraction diagram of the "$Ti_8O_{12}$" film prepared according to Example 4.

The film deposited on the glass plate was in the form of a homogeneous transparent layer, the thickness of which, determined by scanning electron microscopy (SEM), was 100 nm. FIG. 5 shows the SEM image of a cross section through the film. The XRD diagram of the film, as shown in FIG. 6, has two broad features located at around 12.7° and 23.7°, corresponding to amorphous "$Ti_8O_{12}$" interlattice distances and two narrow peaks at 16.1° and 31.8° attributable to an unidentified crystalline phase. Owing to the respective heights of the peaks, the "$Ti_8O_{12}$" phase may be considered as predominant. The interlattice distances of this unidentified phase, calculated from the 2θ angles of 16.1° and 31.8°, using the equation $2d \sin \theta = n\lambda$, where λ=1.5418 (copper anticathode), were 5.47 Å and 2.28 Å, respectively.

EXAMPLE 5

Deposition of "$Ti_8O_{12}$" Films on Glass by Dip Coating

An alcoholic "$Ti_8O_{12}$" solution, the titanium concentration of which was 0.1M, was prepared by introducing 1.8172 g of "$Ti_8O_{12}$" into 100 ml of anhydrous ethanol. The films were produced using the method called "dip coating" described in Example 4. After each deposition, the glass plate was dried by an oven treatment at 75° C. Five films were thus produced on each plate. To test the influence of the heat treatment on the structure of the films, the glass plates were subjected to the following temperature programs:

| | Heat treatment | | |
|---|---|---|---|
| Specimen | Temperature (° C.) | Rate of rise (° C./min) | Duration (h) |
| 1 | 75 | oven | 1 h 30 |
| 2 | 75 | 2 | 3 |
|   | 155 | 4 | 4 |
| 3 | 75 | 2 | 4 |
|   | 155 | 2 | 4 |
|   | 200 | 2 | 4 |
| 4 | 75 | 2 | 4 |
|   | 155 | 2 | 4 |
|   | 200 | 2 | 4 |
|   | 255 | 2 | 4 |
| 5 | 75 | 2 | 4 |
|   | 155 | 2 | 4 |
|   | 200 | 2 | 4 |
|   | 255 | 2 | 4 |
|   | 420 | 2 | 4 |

Figure 7:
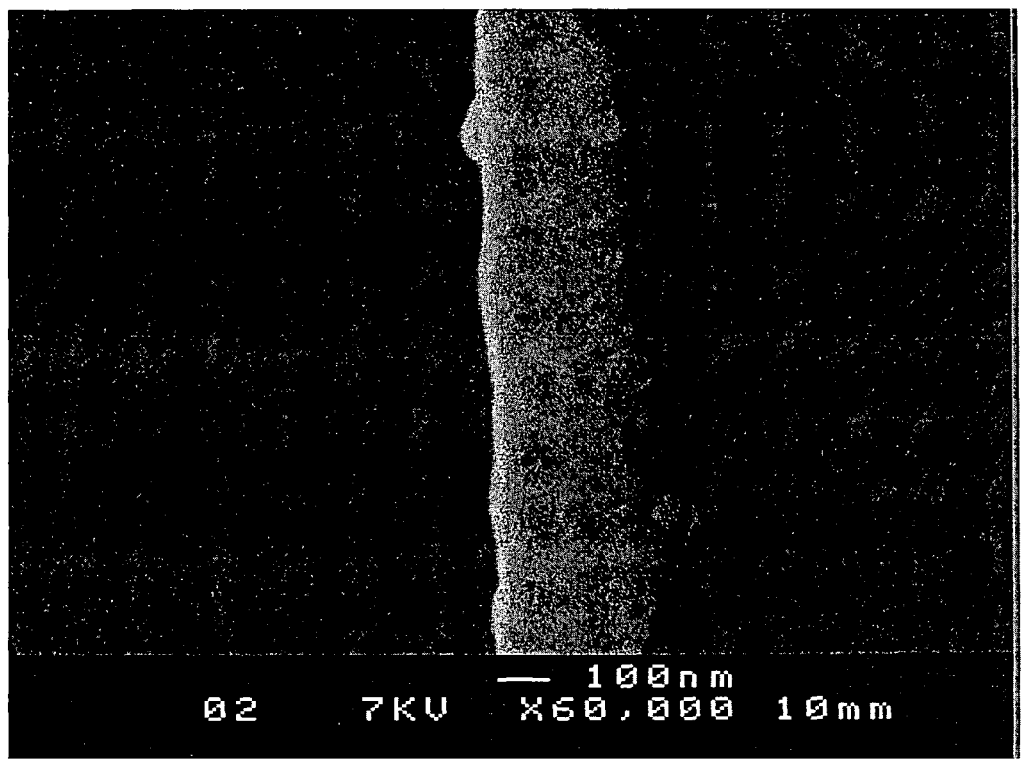
FIG. 7 shows the SEM image of a cross section through the film corresponding to specimen 3 of Example 5.
Figure 8:
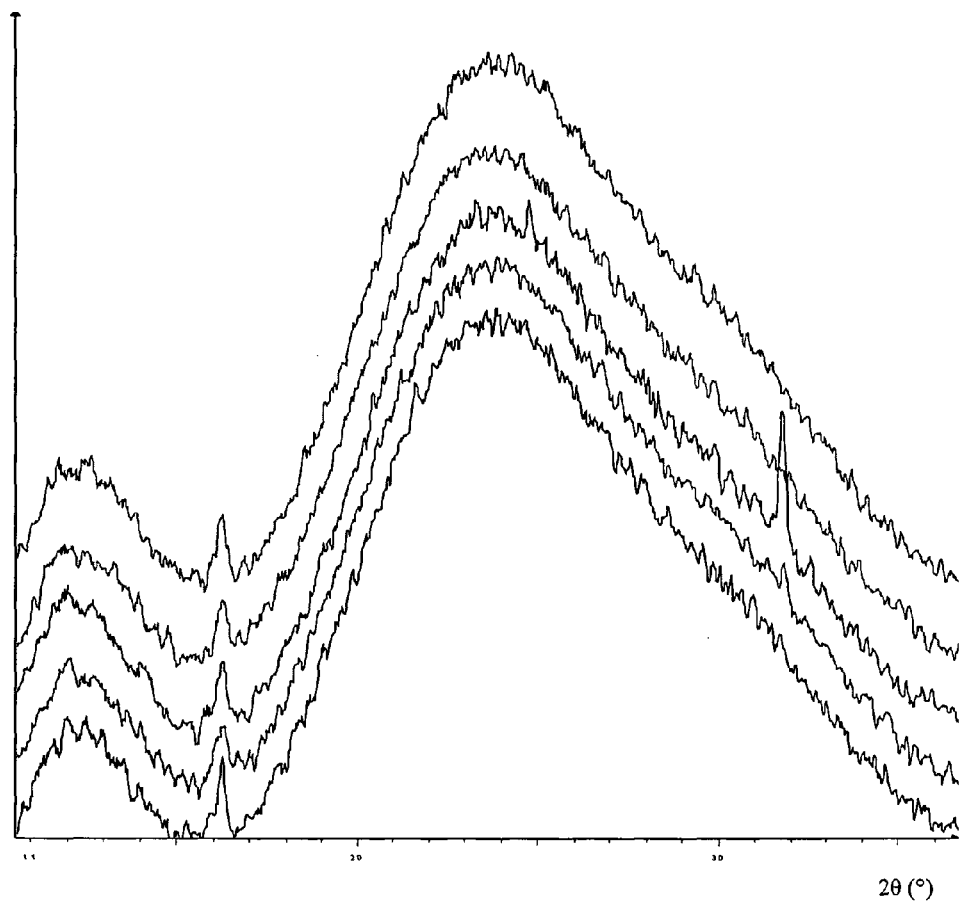
FIG. 8 shows the X-ray diffraction diagrams of the specimens of Example 5.

The film deposited on the glass plate had a thickness, determined by SEM, of 200-250 nm. In FIG. 7, which shows the SEM image of a cross section through the film corresponding to specimen 3, the substantially vertical light region in the middle of the figure represents a "$Ti_8O_{12}$" gel and the dark region on the right of the figure represents the glass substrate. The XRD diagrams are shown in FIG. 8. The curves correspond in order to heat treatments 1, 2, 3, 4 and 5, starting from the bottom. The diagrams show the features located at around 12.7° and 23.7° corresponding to the "$Ti_8O_{12}$" interlattice distances and the lines located at around 31.8° (in the case of specimens 2 and 3) and at around 16.1° C., which correspond to the 5.47 Å and 2.82 Å interlattice distances characteristic of the unknown phase obtained also in Example 4.

EXAMPLE 6

Deposition of "Ti$_8$O$_{12}$" Films on Glass by Spin Coating

An alcoholic tetramethyl ammonium hydroxide (TMAOH) solution was added, drop by drop, using a burette, into a beaker containing "Ti$_8$O$_{12}$" crystals dissolved in 5 ml of ethanol, the molar ratio R=Ti/TMAOH being such that 1.5≦R≦3. Although the addition of TMAOH was stopped before the appearance of the titanium dioxide TiO$_2$ precipitate, the clear solution gradually became viscous. Part of the mixture in solution was thus rapidly deposited on the glass by spin coating. The films were spread by spin coating, by rotating a small volume of solution on the glass with a controlled rotation speed, acceleration and time.

To observe the influence of R on the particle size during deposition on glass by spin coating, various solutions were used. The amounts of compounds used are indicated in the table below.

| "Ti$_8$O$_{12}$" (g) | TMAOH (g) | R = Ti/TMAOH |
|---|---|---|
| 0.500 | 0.3428 | 1.5 |
| 0.500 | 0.2493 | 2 |
| 0.500 | 0.1558 | 3 |

Figure 9:
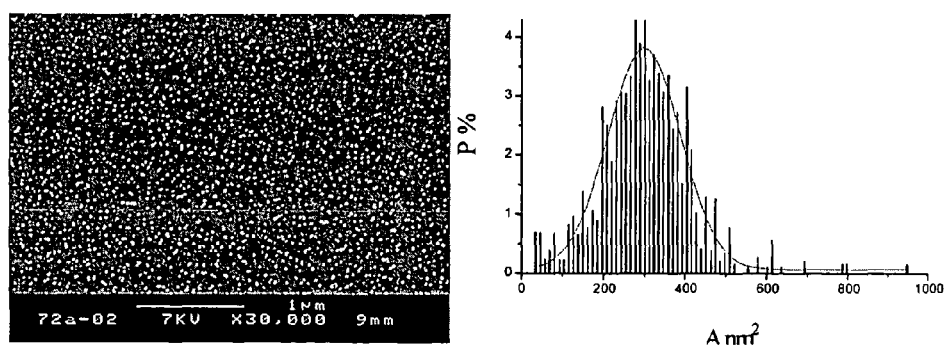
FIG. 9 shows an SEM micrograph and a particle area distribution histogram for Example 6.

The SEM micrograph shown in the left-hand part of FIG. 9 illustrates the particle size obtained for R=1.5. The particle area distribution histogram, in which the areas A in nm are plotted on the X-axis, is shown in the right-hand part of FIG. 9. This shows very good homogeneity of the particle dispersion resulting an 8% coverage factor with a mean particle surface area of around 300 nm$^2$, i.e. a diameter of about 17 nm. The particle size decreases as the Ti/TMAOH ratio increases, that is to say as the pH of the alcoholic solution decreases. By depositing films on glass by spin coating for variable Ti/TMAOH ratios in an alcoholic medium it was possible to obtain monodisperse particles that adhere strongly to the support and had diameters varying from 100 nm to 3 nm.

EXAMPLE 7

Electroplating of "Ti$_8$O$_{12}$" on a Metal Support

Figure 10:
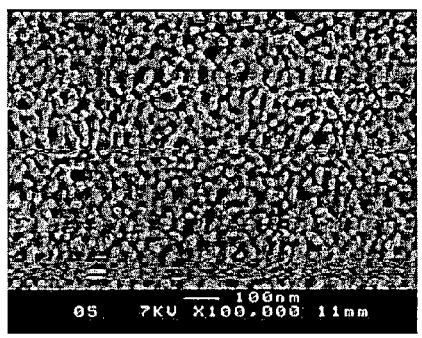
FIG. 10 shows the SEM image of a film prepared as described in Example 7.

An alcoholic "Ti$_8$O$_{12}$" solution, the titanium concentration of which was 0.04 m, was prepared by introducing 0.7269 g of "Ti$_8$O$_{12}$" into 100 ml of anhydrous methanol. An electrode, consisting of a Whatman glass frit membrane 25 mm in diameter (with a pore diameter of 20 nm) covered with a thin film of gold by vacuum evaporation, was then biased at −0.5 V relative to a calomel reference electrode for one hour. The amount of current passed corresponded to 1300 coulombs. The EDX-SEM analysis revealed a Ti/Cl ratio close to 4, i.e. 80% titanium. The SEM image shown in FIG. 10 indicates a relatively uniform film consisting of an agglomerate of particles 10 nm in diameter defining pores of about 10 nm to 20 nm in diameter. Because the Ti/Cl ratio is 4, 75% of the titanium is in the form of TiO$_2$, the rest being in the form of "Ti$_8$O$_{12}$".

EXAMPLE 8

An alcoholic "Ti$_8$O$_{12}$" solution, the titanium concentration of which was 0.01M, was prepared by introducing 0.1817 g of "Ti$_8$O$_{12}$" into 100 ml of anhydrous methanol. An electrode, formed by a Whatman glass frit membrane 25 mm in diameter (with a pore diameter of 20 nm) covered with a thin gold film by vacuum evaporation, was then biased at −0.2 V relative to a calomel reference electrode for 6 hours. The amount of current passed corresponded to 1750 coulombs. The EDX-SEM analysis revealed a Ti/Cl ratio close to 82/18. Given the Ti/Cl ratio, 78% of the titanium was in the form of TiO$_2$, the rest being in the form of "Ti$_8$O$_{12}$".

Figure 11:
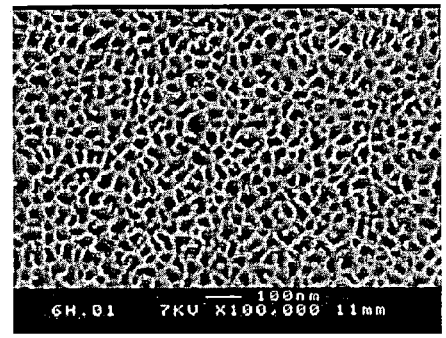
FIG. 11 shows the SEM image of a film prepared as described in Example 8.

The SEM image shown in FIG. 11 reveals the porous structure of the film.

EXAMPLE 9

The photocatalytic activity of the film deposited according to Example 4 was measured by means of a gas-phase methanol degradation test. A volume of 6 ml of methanol-saturated air at 16.3° C., corresponding to a concentration of 500 ppm, was introduced into the reactor using a gas syringe. The whole was kept in the dark for 2 to 3 h so as to reach equilibrium and then exposed to UV radiation ($\lambda$=360 nm). A reduction in methanol concentration of 515 ppm to 440 ppm over 6 h was observed, corresponding to an initial degradation rate of 12.5 ppm/h.

Figure 12:
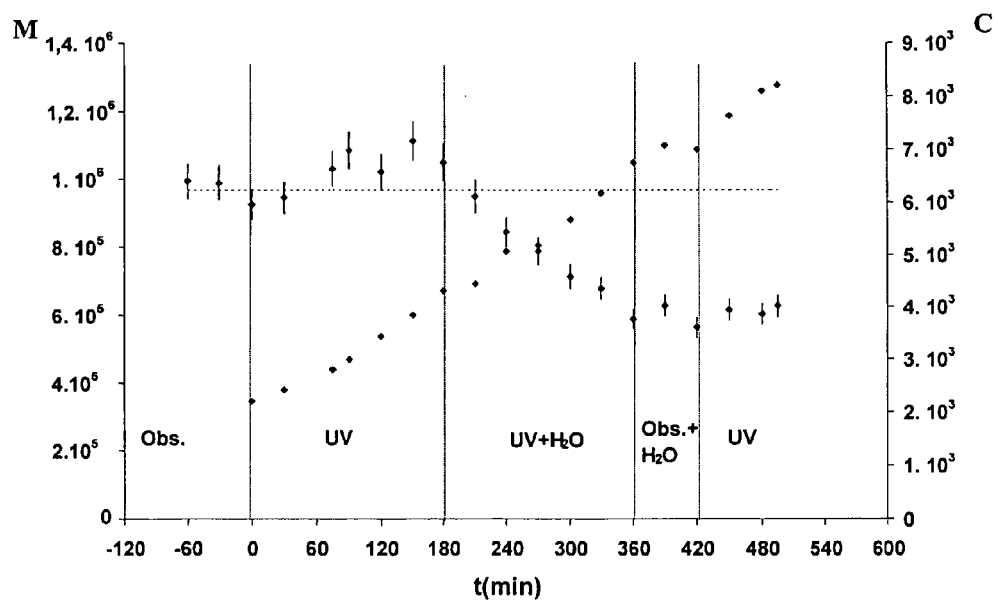
FIG. 12 shows the results of the photocatalytic activity of the film as described in Example 9.

The results of the photocatalytic activity of the film are shown in FIG. 12. The points with vertical bars through them represent the variation as a function of time of the methanol concentration (value M in arbitrary units plotted on the left-hand axis) and the points with no bars represent the variation as a function of time of the CO$_2$ concentration (value C in arbitrary units plotted on the right-hand axis). The various regions indicated in the figure correspond to the parameters tested. The region denoted "Obs." corresponds to equilibrium, the two "UV" regions correspond to UV irradiation, the "UV+H$_2$O" region corresponds to UV irradiation with injection of H$_2$O, and the "Obs.+H$_2$O" region corresponds to equilibrium with H$_2$O injection.

The invention claimed is:

1. A method of preparing titanium aquo-oxo chloride comprising hydrolyzing TiOCl$_2$ in an atmosphere with a relative humidity maintained between around 50 to 60% or in the presence of an alkali metal carbonate A$_2$CO$_3$.

2. The method as claimed in claim 1, wherein the TiOCl$_2$ is in the form of an aqueous TiOCl$_2$.yHCl solution.

3. The method as claimed in claim 2, wherein the aqueous TiOCl$_2$.yHCl solution has an HCL concentration of about 2M.

4. The method as claimed in claim 2, wherein the TiOCl$_2$.yHCl concentration is between 4M and 5.5M.

5. The method as claimed in claim 2, wherein the TiOCl$_2$.yHCl solution is placed at room temperature above an H$_2$SO$_4$/H$_2$O mixture in respective amounts such that the relative humidity is around 50 to 60% and left in contact therewith for about five weeks.

6. A method of preparing titanium aquo-oxo chloride comprising hydrolyzing TiOCl$_2$ in the presence of an alkali metal carbonate A$_2$CO$_3$, wherein a TiOCl$_2$.yHCl solution is brought into contact at room temperature with an alkali metal carbonate A$_2$CO$_3$ in respective amounts such that the Ti/A ratio is 4±0.5 and left in contact therewith for 48 to 72 hours.

7. The method as claimed in claim 6, wherein Ti/A=4±0.1.

* * * * *